(12) United States Patent
Kimble et al.

(10) Patent No.: US 10,499,138 B2
(45) Date of Patent: Dec. 3, 2019

(54) ELECTRONIC HEADPHONE

(71) Applicant: KLK Ventrures LLC, Gary, IN (US)

(72) Inventors: Kevin Kimble, Gary, IN (US); Weylin Stewart, Indianapolis, IN (US)

(73) Assignee: KLK Ventures LLC, Gary, IN (US)

( * ) Notice: Subject to any disclaimer, the term of this patent is extended or adjusted under 35 U.S.C. 154(b) by 0 days.

(21) Appl. No.: 15/998,707

(22) Filed: Aug. 16, 2018

(65) Prior Publication Data

US 2019/0045290 A1  Feb. 7, 2019

Related U.S. Application Data

(63) Continuation-in-part of application No. PCT/US2016/055107, filed on Oct. 3, 2017, which is a continuation of application No. 15/044,503, filed on Feb. 16, 2016, now abandoned.

(51) Int. Cl.
| | |
|---|---|
| *H04R 1/10* | (2006.01) |
| *H04B 1/3888* | (2015.01) |
| *H04B 1/38* | (2015.01) |
| *H04R 5/033* | (2006.01) |

(52) U.S. Cl.
CPC ........... *H04R 1/105* (2013.01); *H04B 1/3888* (2013.01); *H04R 1/1008* (2013.01); *H04R 1/1025* (2013.01); *H04R 1/1066* (2013.01); *H04R 1/1075* (2013.01); *H04B 2001/3894* (2013.01); *H04R 5/0335* (2013.01); *H04R 2420/07* (2013.01); *H04R 2420/09* (2013.01)

(58) Field of Classification Search
CPC .. H04R 1/105; H04R 1/1008; H04R 2420/07; H04R 5/0335; H04R 1/1025; H04B 1/3888

See application file for complete search history.

(56) References Cited

U.S. PATENT DOCUMENTS

| | | | |
|---|---|---|---|
| 4,654,898 A | 4/1987 | Ishikawa | |
| 5,036,681 A | 8/1991 | Schaerer | |
| 5,406,037 A | 4/1995 | Nageno et al. | |
| 5,706,032 A | 1/1998 | Chang | |
| 7,188,896 B2 | 3/2007 | Embach | |
| 7,394,912 B2 * | 7/2008 | Whipple | H04R 5/023 381/376 |
| 2005/0031147 A1 * | 2/2005 | Viala | H04R 9/00 381/334 |
| 2005/0254778 A1 * | 11/2005 | Pettersen | H04R 1/44 386/333 |
| 2007/0053544 A1 | 3/2007 | Jhao et al. | |
| 2008/0144872 A1 | 6/2008 | Phillips | |
| 2010/0135515 A1 | 6/2010 | Walsh | |
| 2014/0334644 A1 | 11/2014 | Selig et al. | |
| 2015/0214991 A1 | 7/2015 | Ranchod et al. | |
| 2016/0338636 A1 * | 11/2016 | IDrees | A61B 5/486 |

* cited by examiner

*Primary Examiner* — Regina N Holder
(74) *Attorney, Agent, or Firm* — Berggren LLP

(57) ABSTRACT

An electronic headphone band with waterproofed electronic components is disclosed. The headphone band is suitable to be used in any kind of activity, including water activities.

8 Claims, 5 Drawing Sheets

ELECTRONIC HEADPHONE

PRIORITY

This application is a Continuation-in-Part application of the international patent application number PCT/US2016/055107 filed on Oct. 3, 2017 and claiming priority of U.S. application Ser. No. 15/044,503 filed on Feb. 16, 2016; the content of both of which is incorporated herein by reference.

FIELD OF THE INVENTION

This invention generally relates to headphones and, more specifically, to a waterproof electronic headphone with infused short-range wireless communication, such as Bluetooth® and speakers.

BACKGROUND OF THE INVENTION

Headphones serve as an output device for audio apparatus for converting an electric signal to sound for output, and includes, at least, a pair of right and left headphone units which are held so as to face the corresponding ears of a wearer in use, and an elastic band providing the coupling between the headphone units and pressing the headphone units against the wearer's ears.

U.S. Pat. No. 5,406,037, for example, describes a headphone having a free-adjustment function enabling one to freely adjust the headphone units relative to the headband. This headphone includes a substantially U-shaped headband and a suspender provided at the intermediate portion of the headband so as to be extended over respective ends of the headband. When the listener wears the headphone on the head, the suspender is not only deformed in accordance with the shape of the listener's head but also is withdrawn from the headphone body so that the headphone unit can be placed at the position in which the headphone units contact with the auricles.

U.S. Pat. No. 7,188,896 is directed to a headphone structure and storage thereof. The headphone structure concept provided includes headphones with rotatable earphones to provide a slimmer profile for storage. Each of the earphones is rotatable between a use position, in which the earphone is sufficiently positioned for listening use by a person wearing the headband, and a stored position. The headphone may have a first width or dimension when the earphone is in the use position and a second lesser width or dimension when the earphone is in the stored position. U.S. Pat. No. 7,188,896 B2 is incorporated herein by reference for at least the purpose of giving context to the present invention.

U.S. Pat. No. 5,036,681 discloses securing an earring to a users ear by means of a magnet; thus, avoiding having to pierce the user's ear. The earring comprises a hinging mechanism wherein one of the ends of the hinge is provided with a magnetic means to confront the ear lobe of a wearer, and the other end is provided with decorative means exteriorly visible when in use. The earring is attached through some additional object (e.g., the earlobe) for long periods of time.

The headphone device using an elastic band (particularly, the aforementioned under-band or neckband style) may slip off the ears in use when the pressing force of the elastic band is decreased. Hence, it is necessary to additionally provide elements to prevent the headphone device from falling off the ears. As a result, manufacturing cost is high.

On the market place there are headphones with short range wireless communication, such as Bluetooth®, but these are generally in-ear headphones. There are some flat speaker headphones available, but they have not become popular due to stability issues, poor audio quality, aesthetics, and susceptibility to moisture and water damage.

Accordingly, there is a need for headphone devices that would satisfy ever growing demands of the users.

SUMMARY OF THE INVENTION

The present invention provides solutions that the prior art fails to provide.

It is an object of the invention to provide a water proof head phone device capable of adjusting to stay in place during the use, without slippage.

To attain the above object, a headphone device according to the present invention has the following features.

According to a first aspect of the invention, there is provided a headphone device including a pair of right and left headphone units, comprising: a padded Lycra band providing a short-range wireless communication, such as Bluetooth® and speakers are placed around the crown of the head and over the ears.

According to a second aspect of the invention, the device is activated by using User Interface e.g. by pressing ON button on the side near the earhole. The same earhole area may also be the location for further user interface controls, e.g. song toggle, connection indicator and volume control.

According to a third aspect of the invention, there is provided a headphone device with padded Lycra band and spandex with moisture wicking comfort that houses Bluetooth® enabled speakers. It has reflective ear molds that keep the ear off the speakers inside the band to minimize moisture buildup.

According to a fourth aspect of the invention, the device could work in all indoor and outdoor environments with peak performance that could include excessive water exposure such as long duration use in rain showers, or in the water dominant environment.

According to a fifth aspect of the invention, the device is charged electrically with a standard USB cord.

According to the above features, the present invention has the following operations and advantages.

According to the first aspect of the invention, the device enhances safety due to head-phone gear slip, for example: a cross fit athlete in the middle of a power cleaning movement could ill afford a misstep mid-set while engaging this activity.

According to the second aspect of the invention, the device provides user friendly design.

It is an object of this disclosure to provide an electronic headphone device comprising: an elastic headband having an inner surface and an outer surface, and at least one pocket; a headphone having two earpieces having speakers with connection to short range wireless communication receiver; and a waterproofed user interface for controlling the receiver, wherein the earpieces and the wireless communication receiver locate in waterproof casings inside the at least one pocket, and wherein the user interface is attached onto the outer surface of the headband.

It is an object of this disclosure to provide an electronic headphone device comprising: a headband made of elastic waterproof material and having an outer layer and an inner layer, and a pocket closeable with a zipper and formed in between of the layers, and a headphone having two earpieces with speakers and connected to a short range communication receiver with waterproofed wiring, wherein each earpiece with speakers is covered with a waterproof casing locating inside the pocket along with the waterproofed wiring, the short range communication receiver locates in a closed rubber casing inside the pocket; and a waterproofed user interface to operate the receiver is attached on an outer side of the headband by gluing or sewing.

The present head-phone invention as presently configured as described above allows the provision of a headphone device which is capable of having headphone units that will slip off the wearer's ears (even when the headphone device is the so-called under-band or behind the neck style. Further, such an improved headphone device as described herein, can be manufactured at a low cost.

Other features and advantages of the present invention will become more apparent from the following detailed description, taken in conjunction with the accompanying drawings which illustrate, by way of example, the principles of the invention.

BRIEF DESCRIPTION OF THE DRAWINGS

To further clarify various aspects of some example embodiments of the present invention, a more particular description of the invention will be rendered by reference to specific embodiments thereof which are illustrated in the appended drawing. It is appreciated that the drawing depicts only illustrated embodiments of the invention and are therefore not to be considered limiting of its scope. The invention will be described and explained with additional specificity and detail through the use of the accompanying drawing in which:

In FIG. 6A the user interface includes holes for sewing it to the headband; the embodiment of FIG. 6B is glued on the band.

DETAILED DESCRIPTION OF THE INVENTION

The following detailed description refers to the accompanying drawings that illustrate the embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

In this application, the use of the disjunctive is intended to include the conjunctive. The use of definite or indefinite articles is not intended to indicate cardinality. In particular, a reference to "The" object or "a" and "an" object is intended to denote also one of a possible plurality of such objects.

Headphones serve as an output device for audio apparatus for converting an electric signal to sound for output, and includes, at least, a pair of right and left headphone units which are held so as to face the corresponding ears of a wearer in use, and an elastic band providing the coupling between the headphone units and pressing the headphone units against the wearer's ears.

Figure 1:
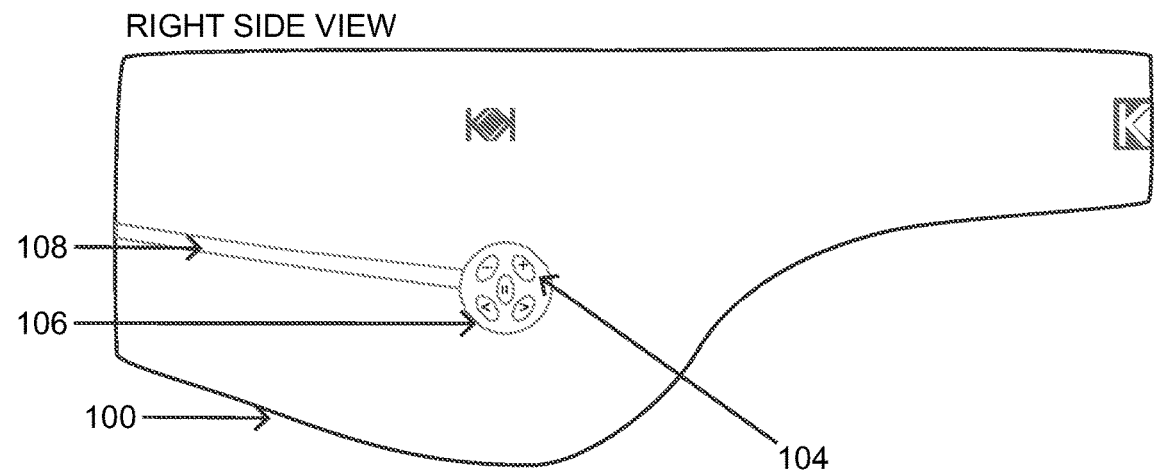
FIG. 1 is a diagram illustrating the right-side view of the headband housing the electronic headphone.
Figure 2:
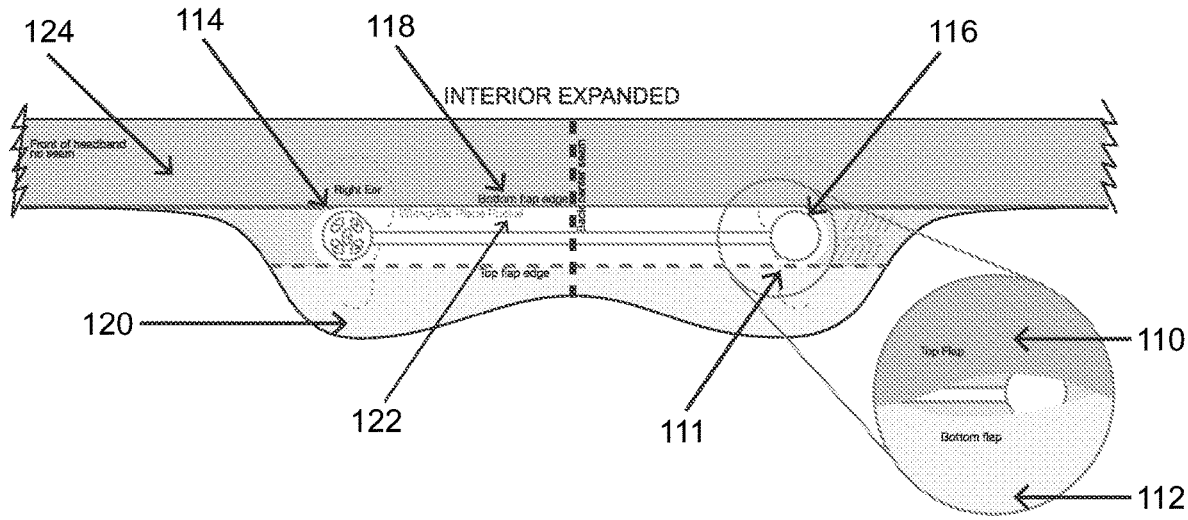
FIG. 2 is a diagram illustrating the interior exploded view of the headband housing the electronic headphone.

One embodiment according to the present invention will be described hereinafter with reference to the accompanying drawings. FIGS. 1 and 2 illustrate appearance of a headphone device formed as an embodiment according to the present invention. In detail, FIG. 1 is a side view and FIG. 2 is an interior exploded view.

In the embodiment shown in FIGS. 1 and 2, there is shown the headphone device 100, which comprises an elastic headband 124, and earphones 114 and 116 having speakers 104. The earphones in this embodiment locate in earphone pockets 111 on the inner surface 120 of the headband and the pockets have two overlapping flaps 110 and 112 to cover the earphone inside the pocket. The wiring 108 of the earphones is concealed under a flexible strap 122 that is running on the inner side 120 of the headband. In this embodiment the user interface 104 to control short range wireless communication (e.g. Bluetooth) locates around the area that covers the ear, however the user interface may locate in any convenient location on the headband, for example on the forehead area.

Figure 3:
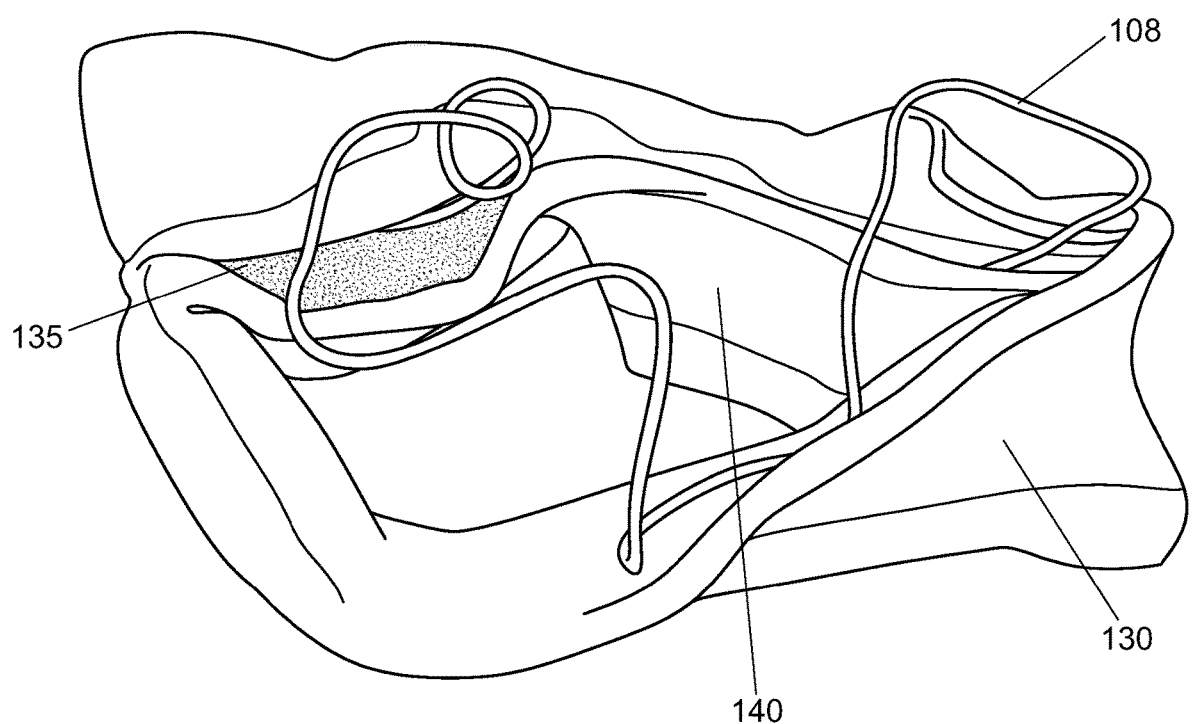
FIG. 3 illustrates a pocket for the headphones and/or wiring.

In FIG. 3 another embodiment for the earphone pocket is illustrated. Here, the wiring 108 is concealed in a pocket 111 that is formed in between an outer headband layer 130 and an inner headband layer 140. The pocket may be closed with a zipper 135 or with hook and look attachment of any other suitable manner. Between the upper layer and the lower layer there may also be inserted insulation material.

Figure 4:
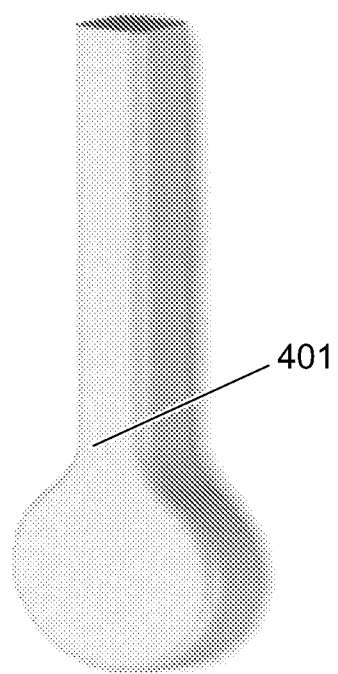
FIG. 4. illustrates water proof casing for speakers.
Figure 5A:
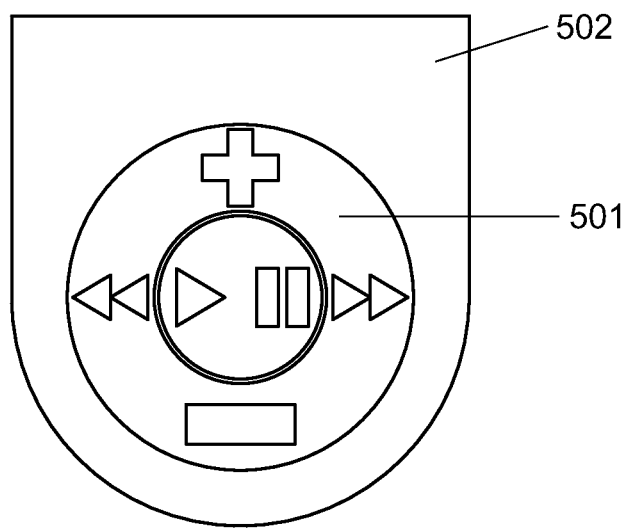
FIG. 5A illustrates user interface attached to a short range wireless communication receiver.
Figure 5B:
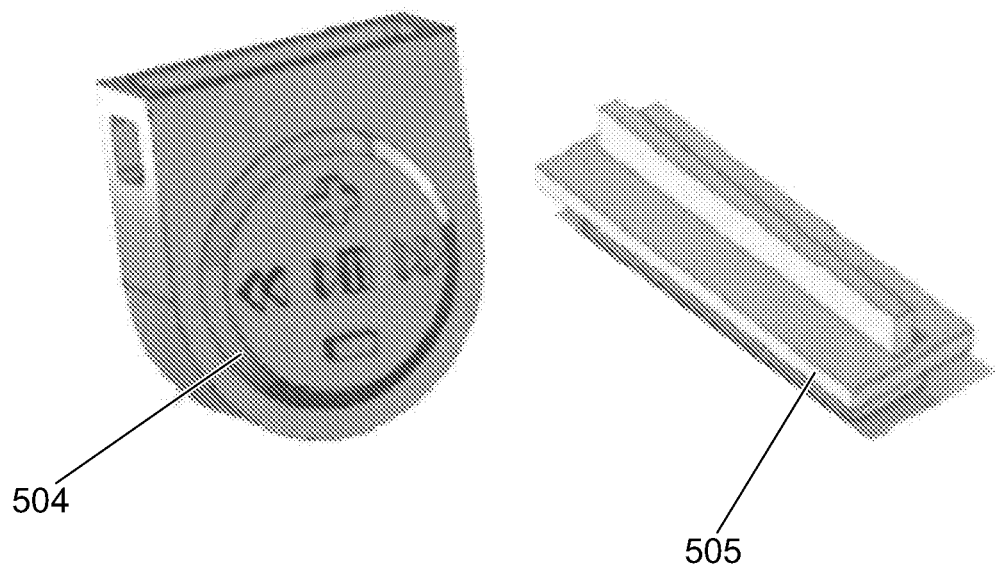
FIG. 5B illustrate water proof main housing unit (casing) for a short range wireless communication receive and a lid for the main housing unit.

An essential feature of the device according to this invention is its waterproofness, the device can be used even during water activities. According to one embodiment the water proofing is achieved by concealing the earpieces (114 and 116 in FIG. 1) into a casing 401 such as shown in FIG. 4. The casing may be made of any suitable material, for example various plastics, rubber, latex, and polychloroprene. In order to achieve appropriate waterproofing, the user interphase 501 attached to short wavelength wireless communication (Bluetooth) receiver 502 may be contained in plastic or rubber casing 504 (FIGS. 5A and B). Here an embodiment is shown where the rubber casing 504 is closed tightly with a lid 505. According to another embodiment all the electrical elements, including the earpieces, user interphase, receiver and the wires are waterproofed by coating them with silicone. With this embodiment no plastic casings are needed. By coating the electrical elements with four silicone coatings the device was waterproofed for at least 5 minutes complete water soak (device was kept under water for 5 minutes without causing any failure of the electronic components, including audio functionality).

Experiments were conducted to test the waterproofing of the device, and it was found that both the rubber casing as well as the silicone coating provided waterproofing such that the electronic headphone was completely functional, after having been soaked into water for several times.

Figure 6A:
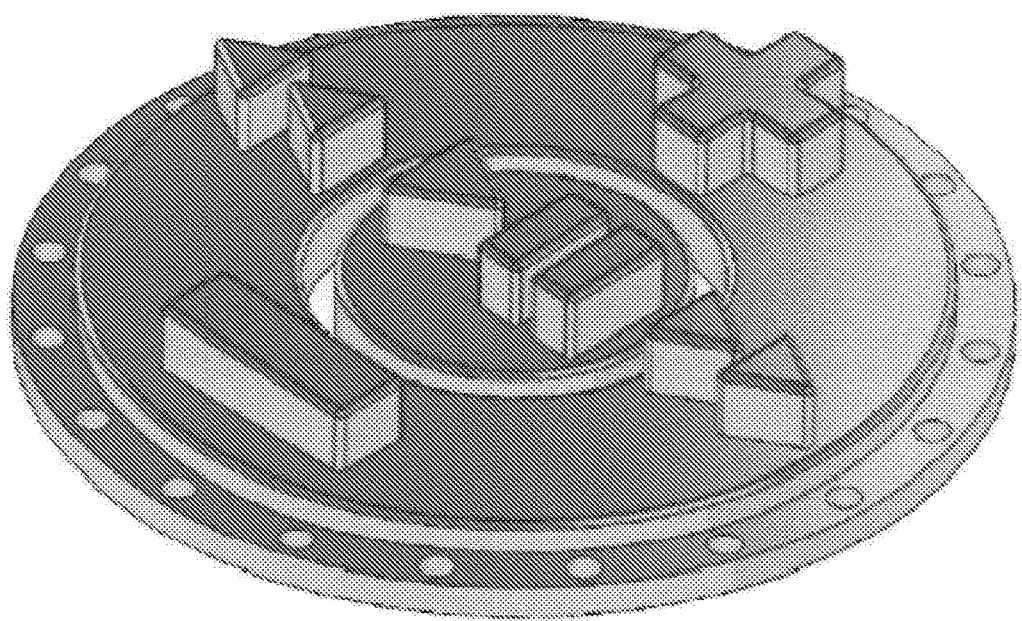
FIGS. 6A, and B illustrates the User Interface with raised buttons with alternative attaching methods.
Figure 6B:
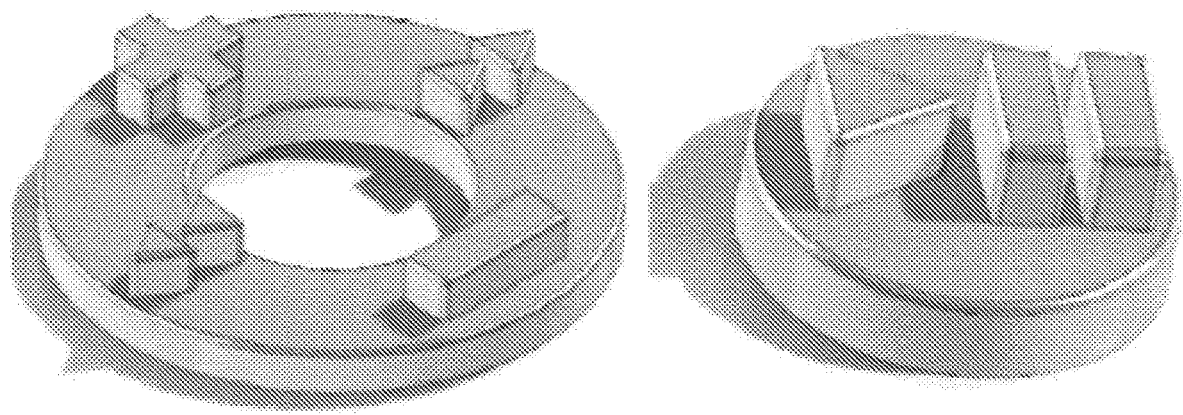

FIGS. 6A and B illustrates various alternatives of the User Interface. A common feature for these alternatives is that they have raised up buttons to ease the use. The User Interface of FIG. 6A has holes around the device such that it can be attached onto the headband fabric by sewing. FIG. 6B on the other hand illustrates variations where the user interface is to be attached onto the headband fabric by gluing. In addition to these alternatives, a skilled artisan would be able to consider other attaching methods.

One of the advantages of the current invention is to provide safety, renewed mental focus and user friendly design to the user like runners, practicing persons, boxers, swimmers, and especially the device is suitable for conditions with moisture. The headband may be made of any elastic and preferably water-resistant material. According to one embodiment the headband is made from water resistant padded Lycra band Drylete polyester 90% and spandex 10% so that it could manage excessive sweat while ear molds deter buildup from speakers into the ear.

In accordance with the invention, the electronic headphone device 100 will stay in place at all times while wearing on head and eliminating all possible slippage.

It is to be understood that the above description is intended to be illustrative, and not restrictive. For example, the above-discussed embodiments may be used in combination with each other. Many other embodiments will be apparent to those of skill in the art upon reviewing the above description.

Plural instances may be provided for components, operations or structures described herein as a single instance. Finally, boundaries between various components are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An electronic headphone device comprising:
   an elastic headband having an inner layer with an inner surface forming an inner surface of the headband, and an outer layer with an outer surface forming an outer surface of the headband, and at least one closable pocket in between the layers;
   the inner surface of the headband having two earpiece-pockets each having two overlapping closing flaps;
   a headphone having two waterproofed earpieces having speakers with connection to short-range wireless communication receiver, the receiver located in a closed waterproof casing inside the at least one pocket, and each of the waterproofed earpieces located in one of the earpiece-pockets; and
   a waterproofed user interface for controlling the receiver and located on the outer surface of the headband,
   wherein the device is fully functional after having been dipped into water for at least five minutes.

2. The device of claim 1, wherein the waterproof casing is made of rubber or silicone.

3. The device of claim 1, wherein a water-resistant strip is attached onto the inner surface of the head band and wiring between the earpieces and the receiver is located underneath the strip.

4. The device of claim 3, wherein the wiring is waterproofed by silicone.

5. The device of claim 1, wherein the at least one closable pocket is closeable with a se-zipper or a hook and loop fabric.

6. The device of claim 1, wherein the short-range communication receiver and user interface are attached to each other and located in a rubber casing.

7. The device of claim 1, wherein the earpieces, the receiver and the user interface are waterproofed with silicone.

8. The device of claim 1, wherein the user interface is attached onto the outer surface of the headband by gluing or sewing.

* * * * *

UNITED STATES PATENT AND TRADEMARK OFFICE
CERTIFICATE OF CORRECTION

| | |
|---|---|
| PATENT NO. | : 10,499,138 B2 |
| APPLICATION NO. | : 15/998707 |
| DATED | : December 3, 2019 |
| INVENTOR(S) | : Kevin Kimble and Weylin Stewart |

It is certified that error appears in the above-identified patent and that said Letters Patent is hereby corrected as shown below:

On the Title Page

Item (71), should read:
Applicant: KLK Ventures LLC, Gary, IN (US)

Signed and Sealed this
Seventh Day of February, 2023

Katherine Kelly Vidal
*Director of the United States Patent and Trademark Office*